3,438,256
MULTIRANGE THERMAL DEVICE
Samuel H. Schwartz, Deerfield, Ill., assignor to The Dole Valve Company, Morton Grove, Ill., a corporation of Illinois
Filed Aug. 31, 1966, Ser. No. 576,481
Int. Cl. G01k 5/32
U.S. Cl. 73—368.3     7 Claims

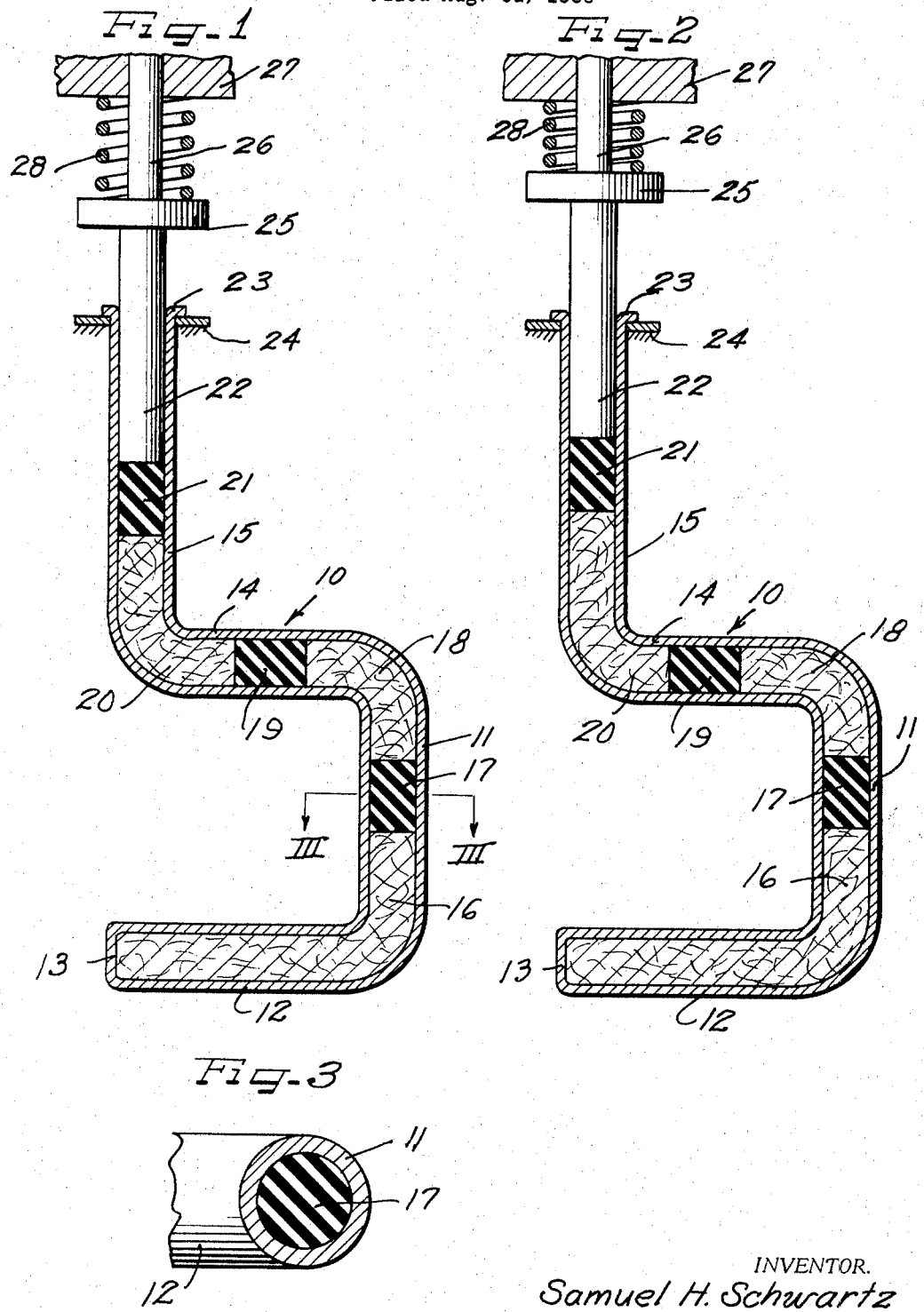

ABSTRACT OF THE DISCLOSURE

A multiple stage thermally responsive force transmitter comprising a series of elastomeric elements in a body alternating in column like form with a series of thermally expansible masses responsive to different rates of expansion. Sections of said columns are formed to be disposable in different adjacent atmospheric areas.

---

The present invention relates to a temperature force transmitting device and more particularly to a multiple range temperature responsive device embodying a plurality of thermal elements or masses having different thermal rates of expansion.

In certain applications of thermally responsive elements or devices, it is desirable to have the single device so designed that it is adapted to have different ranges of expansion of the thermal material in response to temperature changes in different surrounding atmospheres or environments. For illustration, this might be true in the use of the device in conjunction with room air conditioners where it is desirable to sense return air temperatures in the 70°–90° F. range, and also to be able to sense an evaporator freeze-up at 32° F. Another application that has been considered is for automotive use where some combination of car temperature and heater discharge temperature is desirable.

An object, therefore, of this invention is to provide a multiple range thermally responsive force applying device readily adaptable for contemporaneous use in adjoining but different atmospheres having different temperature ranges.

Yet another object of this invention is to provide a simple and inexpensive temperature responsive force transmitting device with a series of different temperature responsive elements or masses separated from each other but all coacting with a common force applying member and yet so located that they may be readily applied for separate uses in different atmospheres.

A further object of this invention is to provide a simple columnar type temperature responsing device wherein temperature responsive masses alternate with resilient or elastomeric elements but wherein the entire column acts on a common force applying device.

In accordance with the general features of this invention, there is provided in a multiple stage thermally responsive force transmitting device, a hollow body with a piston projecting through and out of an open end thereof, a series of elastomeric elements in the body spaced from each other, a series of masses of thermally expansible material alternating with the elements from the body open end to a closed body end there being one for each of the spaces, the materials having different rates of expansion in response to temperature changes but all reacting in column-like manner against the piston projecting from the body to move the same in applying a force, and one of the masses being located adjacent the closed body end and whereby the closed body end upon disposition in an atmosphere having a temperature different from that of the atmospheric area encompassing the body enclosing the next and adjoining mass will afford a different rate of expansion from that of the adjoining mass.

Another feature of the invention relates to the angulating of the body of the aforesaid device so as to position different portions thereof in separate zones for ready application and use in different temperature areas.

Other objects and features of this invention will more fully appear from the following detailed description taken in connection with the accompanying drawing which illustrates a single embodiment thereof, and in which:

FIGURE 1 is a fragmentary vertical cross sectional view partly in elevation taken through a device embodying my invention;

FIGURE 2 is a fragmentary cross sectional view similar to FIGURE 1 but showing the piston projected out of the body of the device by the expansion of thermal masses therein; and FIGURE 3 is a transverse sectional view taken on the line III—III of FIGURE 1 looking downwardly.

As shown on the drawings:

The reference character 10 designates generally an angulated body or housing of the device made from any suitable material, such for example as metal or plastic. This body includes a U-shaped portion 11, one leg 12 of which is closed at 13 and the other leg 14 of which leads into a lateral extension 15.

Positioned in the body 10 are a series of spaced thermally responsive masses 16, 18 and 20 alternating with elastomeric elements 17 and 19 in columnar-like fashion, and at the upper end of which column is another elastomeric element 21 against which a piston 22 is adapted to bear.

The thermally responsive masses 16, 18 and 20 may be made of any suitable thermally responsive material, such as wax or paraffin, each having a given rate of coefficient of expansion with an increase in temperature. The columnar series of masses 16, 18 and 20 may have different rates of expansion, but all, by virtue of them being in a single column, react or apply the composite forces of the masses, due to expansion, against the piston 22.

The elements 17, 19 and 21 may each be made of any suitable elastomeric or rubber-like material having the characteristic of changing its shape under pressure by the expansion of associated mass or masses.

The piston 22 may be made of any suitable construction and is disposed in the open end in the body 10, and more particularly in the lateral extension 15 which defines a bore for the piston. The upper end of the extension 15 is flanged at 23 for suitable attachment to a support 24 depending upon the application to which the device is put.

The outer end of the piston rod 22 has a head 25 bearing against the extremity of an element 26 to be actuated by the force applied to piston 22. This movable element 26 is slidably supported in a fixed member 27 between which and the piston head 25 is disposed a compression spring 28 for at all times urging the piston into the extension 15 of the body 10. The member 26 may actuate any suitable mechanism, such as a switch (not shown), which is to be controlled by the action of temperature on the masses 16, 18 and 20.

One of the advantages of this device is that the different thermally responsive masses, by virtue of their being separated, may expand individually and at different rates of expansion depending upon their composition. It has the added advantage of being able to sense different temperatures in several places or areas in order to control a single mechanism.

FIGURE 2 shows the movement that takes place in the device when the masses are expanding by temperature changes causing the piston to be moved partly out of the tube against the force of the spring 28 thus moving member 26 for actuating the desired mechanisms (not shown).

One application would be in a room conditioner where it is desirable to sense return air temperatures in the 70°–90° F. range, and also be able to sense an evaporator freeze-up at 32° F. In this respect, one portion of the device, such as leg 12, could be inserted in the evaporator and the remaining portions could be subjected to the return air temperatures.

Another application might be in an automotive car temperature sensing structure, where some combination of car temperature and heater discharge temperature is desirable. In this application, the leg 12 of the body could be inserted in the heater discharge and the remaining portions of the device would be disposed so as to be subjected to the temperature in the car itself.

I claim as my invention:

1. In a multiple stage thermally responsive force transmitting device:
    a hollow body with a piston projecting through and out of an open end thereof,
    a series of elastomeric elements in the body spaced from each other,
    a series of masses of thermally expansible material alternating with said elements from said body open end to a closed body end there being one for each of said spaces,
    said materials having different rates of expansion in response to temperature changes but all reacting in column-like manner against the piston projecting from the body to move the same in applying a force, and
    one of said masses being located adjacent the closed body end and whereby said closed body end upon disposition in an atmosphere having a temperature different from that of the atmospheric area encompassing the body enclosing the next and adjoining mass will afford a different rate of expansion from that of said adjoining mass.

2. The device of claim 1 further characterized by said body being angulated with at least portions of said masses being in angular relationship to each other.

3. The device of claim 1 further characterized by said body being angulated with at least portions of said masses being in angular relationship to each other, and there being provided resilient means for impelling said piston in a direction into the body and against the column of alternating elements and masses in the body.

4. The device of claim 1 further characterized by said body including a U-shaped portion with one leg of said U closed to form said closed end and the other leg having a lateral extension forming the open end of said body and into which said piston slidably projects.

5. The device of claim 1 further characterized by said body including a U-shaped portion with one leg of said U closed to form said closed end and the other leg having a lateral extension forming the open end of said body and into which said piston slidably projects, said closed leg being configurated to be bodily insertable into an area having a different temperatured atmosphere from that of the atmosphere encompassing other portions of said body, and said temperature responsive mass in said closed leg having a different coefficient of expansion from that of any other masses in said body.

6. The device of claim 1 further characterized by said body including a U-shaped portion with one leg of said U closed to form said closed end and the other leg having a lateral extension forming the open end of said body and into which said piston slidably projects, and said piston being held in yieldable contact with one of said elements in said body leg extension for the transmission of forces in response to changes occurring in said masses in the body resulting from changes in temperature.

7. In a thermally responsive force transmitting device, an angulated hollow body with a force applying element closing an open end of said body,
    said body including a U-shaped portion having a leg thereof defining the closed end of said body, thermally responsive means in said closed end, elastomeric means between said mass and said force transmitting element for applying force in response to expansion of said thermally responsive means to said element,
    said closed leg being configurated to be bodily insertable into an area the temperature of which is to act on the thermally responsive means in said leg,
    said thermally responsive means comprising a series of separated masses and said elastomeric means comprising a series of elements alternating with said masses in columnar arrangement in said body so as to all react on said force applying element upon expansion of said masses separately and collectively.

References Cited

UNITED STATES PATENTS

| | | | |
|---|---|---|---|
| 2,828,920 | 4/1958 | Kucera | 236—9 |
| 3,180,150 | 4/1965 | Horne | 73—368.1 |
| 3,319,467 | 5/1967 | Feinberg | 73—362.3 |

LOUIS R. PRINCE, *Primary Examiner.*

W. HENRY II, *Assistant Examiner.*

U.S. Cl. X.R.

236—100